United States Patent
West (10) Patent No.: US 11,009,867 B1
(45) Date of Patent: May 18, 2021

(54) LOW-COST DISTRIBUTED MULTIFUNCTION RADIO FREQUENCY (MFRF) SWARMING UNMANNED AIRCRAFT SYSTEMS (UAS)

(71) Applicant: Rockwell Collins, Inc., Cedar Rapids, IA (US)

(72) Inventor: James B. West, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 577 days.

(21) Appl. No.: 15/663,418

(22) Filed: Jul. 28, 2017

(51) Int. Cl.
| | |
|---|---|
| *G05D 1/00* | (2006.01) |
| *B64C 39/02* | (2006.01) |
| *H01Q 3/38* | (2006.01) |
| *B33Y 80/00* | (2015.01) |
| *H01Q 21/29* | (2006.01) |

(52) U.S. Cl.
CPC ........... *G05D 1/0022* (2013.01); *B33Y 80/00* (2014.12); *B64C 39/024* (2013.01); *G05D 1/0027* (2013.01); *H01Q 3/385* (2013.01); *H01Q 21/29* (2013.01); *B64C 2201/126* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 4,004,487 | A * | 1/1977 | Eichweber | F41A 23/34 89/1.815 |
| 6,056,237 | A * | 5/2000 | Woodland | F42B 15/22 244/3.15 |
| 6,977,618 | B1* | 12/2005 | Hanewinkel, III | H01Q 1/1235 343/705 |
| 7,629,918 | B2* | 12/2009 | Brown | F41H 13/0043 342/13 |
| 9,541,350 | B1* | 1/2017 | Sierchio | F41G 7/346 |
| 10,054,941 | B1* | 8/2018 | Beard | G08G 5/006 |
| 10,505,622 | B1* | 12/2019 | Stein | B64D 17/80 |
| 2005/0115385 | A1* | 6/2005 | Rodriguez | F41A 33/02 89/1.11 |
| 2008/0018525 | A1* | 1/2008 | Svy | G01S 7/024 342/169 |

(Continued)

*Primary Examiner* — Nicholas K Wiltey
(74) *Attorney, Agent, or Firm* — Suiter Swantz pc llo (57) ABSTRACT

A multi-function radio frequency (MFRF) system may deploy groups of small or micro-sized unmanned aircraft systems (UAS) to achieve various MFRF functions and mission objectives. Each member UAS may incorporate structurally integrated/embedded, conformal/appliqué, or mechanically deployable antenna elements, or may utilize characteristic mode transducers to excite conductive exterior surfaces of the UAS, such that each UAS may maximize its limited size or surface area to emit MFRF radiation according to a variety of MFRF operating modes. Member UAS may be fashioned by three-dimensional additive manufacturing (3DAM) techniques. Each UAS may coordinate their positioning and MFRF emissions with other member UAS to collectively form synthetic apertures and swarms capable of MFRF functionalities not achievable by a single UAS. UAS swarms may form new subswarms or dynamically reconfigure depending on changing mission objectives or battlefield conditions.

8 Claims, 8 Drawing Sheets

(56) References Cited

U.S. PATENT DOCUMENTS

| | | | |
|---|---|---|---|
| 2012/0209652 A1* | 8/2012 | Khosla | G06Q 10/0631 705/7.16 |
| 2013/0170171 A1* | 7/2013 | Wicker | H01L 21/4846 361/809 |
| 2013/0201050 A1* | 8/2013 | Hellsten | G01S 7/4021 342/21 |
| 2014/0249693 A1* | 9/2014 | Stark | B64C 39/024 701/2 |
| 2014/0268607 A1* | 9/2014 | Wicker | H05K 1/0284 361/761 |
| 2015/0237569 A1* | 8/2015 | Jalali | H04W 84/06 370/326 |
| 2015/0301529 A1* | 10/2015 | Pillai | H04L 67/12 701/2 |
| 2016/0088498 A1* | 3/2016 | Sharawi | G01R 29/10 370/241 |
| 2016/0097615 A1* | 4/2016 | Pruett | F41A 19/66 89/125 |
| 2016/0112116 A1* | 4/2016 | Jalali | H04W 16/28 370/252 |
| 2016/0134358 A1* | 5/2016 | Jalali | H04B 7/18504 455/11.1 |
| 2016/0273880 A1* | 9/2016 | Dryer | F42B 15/01 |
| 2016/0275801 A1* | 9/2016 | Kopardekar | G08G 5/0069 |
| 2016/0337027 A1* | 11/2016 | Jalali | H04B 7/18504 |
| 2017/0069214 A1* | 3/2017 | Dupray | G08G 5/0021 |
| 2018/0316601 A1* | 11/2018 | Sackman | H04L 45/125 |
| 2020/0062392 A1* | 2/2020 | Yoon | G01S 19/015 |
| 2020/0349852 A1* | 11/2020 | DiCosola | G06Q 10/0832 |

\* cited by examiner

LOW-COST DISTRIBUTED MULTIFUNCTION RADIO FREQUENCY (MFRF) SWARMING UNMANNED AIRCRAFT SYSTEMS (UAS)

BACKGROUND

Next-generation warfare requires unprecedented network functionality for which multi-functional radio frequency (MFRF) systems are critical enablers. MFRF systems enable the integration of several radio systems into a common multi-band system; for example, MFRF systems may extend from the HF (2-30 MHz) through W (75-110 GHz) bands depending on the concept of operations (CONOPS). Such MFRF systems may require Ultra-Wide Band (UWB) electrically small and reconfigurable antenna and electronically scanned antenna array (ESA) technologies. While unmanned aircraft systems (UAS, also unmanned aerial vehicles (UAV)) present a means for extending MFRF functionality into previously inaccessible locations, small and micro-size UAS present a challenge for some antenna wavelengths due to their small size and the corresponding severe platform real estate restrictions. For example, smaller UAS may not independently be able to achieve a reasonable antenna radiation efficiency at some wavelengths. Similarly, larger and obtrusive antenna arrays (e.g., active ESA) may present aerodynamic, weight, and DC power consumption challenges.

SUMMARY

Embodiments of the inventive concepts disclosed herein are directed to UAS of variable size wherein the available exterior surface is maximized for antenna radiation via the use of structurally integrated, conformal, or mechanically deployable antenna elements. In some embodiments, characteristic mode transducers may excite EM radiation on conductive exterior surfaces. Smaller and micro-size UAS may coordinate antenna radiation in swarms to create synthetic apertures to perform MFRF functions in distributed fashion; swarms may break up into sub-swarms to perform multiple MFRF functions within a single swarm.

In one aspect, embodiments of the inventive concepts disclosed herein are directed to a compact UAS capable of coordinated and distributed MFRF functionality. The UAS includes an onboard control system capable of maneuvering the UAS based on input from a remote operator by adjusting the heading, position, velocity, or orientation of the UAS. The external surfaces of the UAS may include one or more antenna elements configured for generating and emitting MFRF signals. The control system may coordinate the maneuvering of the UAS and the emission of MFRF signals with additional UAS, based on remote user input, to fulfill various MFRF functions or objectives.

In a further aspect, embodiments of the inventive concepts disclosed herein are directed to an MFRF system of swarming UAS. The system may include a group, or swarm, of UAS, each UAS including an onboard control system wirelessly linked to one or more remote operators. The onboard control systems may maneuver the UAS by adjusting the velocity, heading, position, or orientation of the UAS based on user input received from the remote operators. The external surfaces of each UAS may include antenna elements connected to the onboard control systems and configured for emitting MFRF signals. Each member UAS of the group may be configured to operate as a swarm in conjunction with the other UAS, by coordinating the maneuvering of each UAS and the emission of MFRF signals according to MFRF operating modes (e.g., mission objectives).

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system of UAS of variable size wherein the available exterior surfaces of each UAS are maximized for MFRF antenna radiation via the use of structurally integrated, conformal, or mechanically deployable antenna elements. In some embodiments, characteristic mode transducers may excite EM radiation on conductive exterior surfaces of the UAS. Smaller and micro-size UAS may coordinate antenna radiation in swarms to create synthetic apertures to perform MFRF functions in distributed fashion; swarms may break up into sub-swarms to perform multiple MFRF functions within a single swarm.

Figure 1:
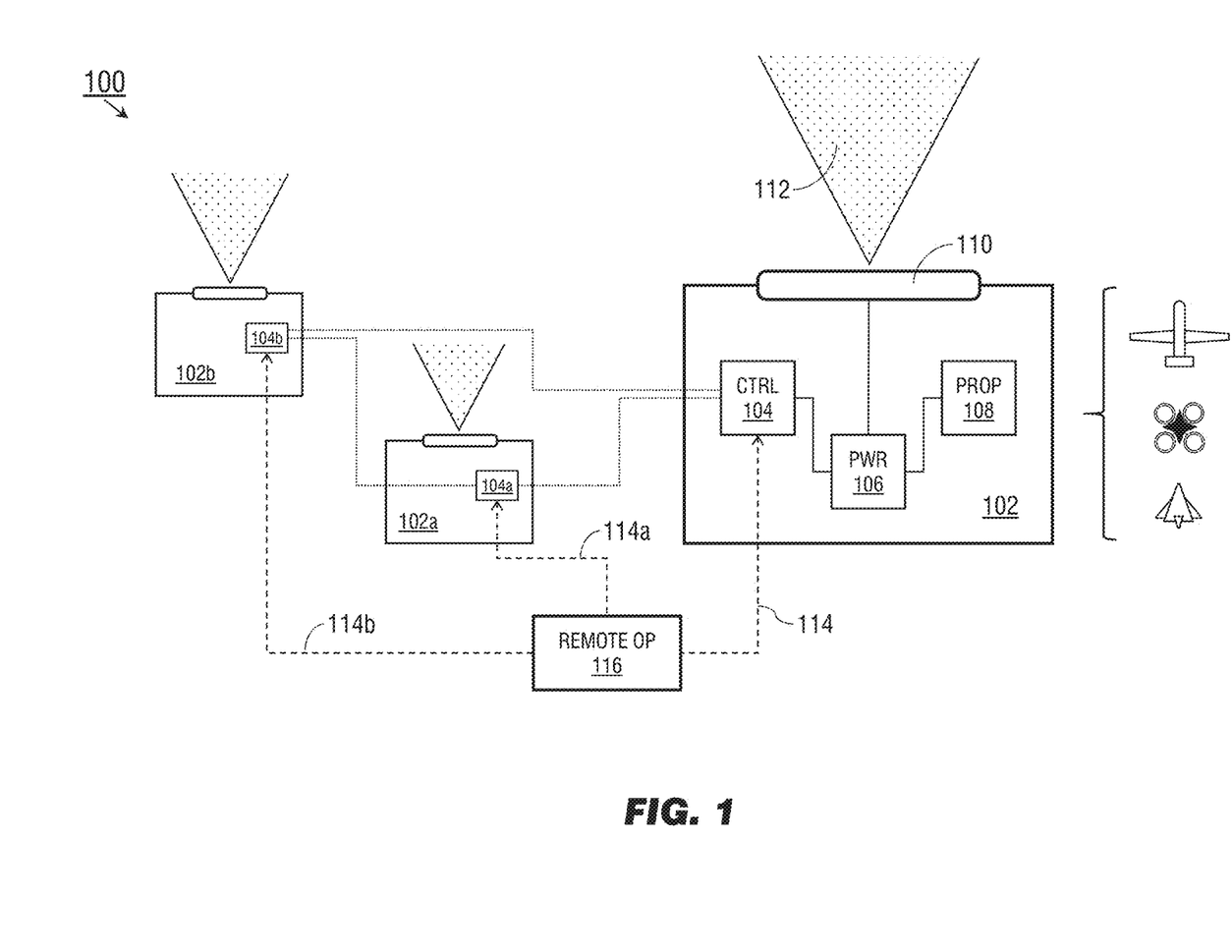
FIG. 1 is a diagrammatic illustration of an exemplary embodiment of an MFRF system of compact UAS according to the inventive concepts disclosed herein.

Referring to FIG. 1, an exemplary embodiment of a multi-function radio frequency (MFRF) system 100 may include unmanned aircraft systems 102 (UAS) incorporating an onboard control system 104, onboard power source 106, propulsion control system 108, and antenna element/s 110. The UAS 102 may incorporate any appropriate design configuration (e.g., multicopter, rear-engine, delta-wing) or size (e.g., micro-scale, compact, small-scale through large-scale UAS of a size comparable to manned aircraft) and thus its external surfaces may be configured in a variety of ways. The UAS 102 may maximize the available external surfaces, regardless of configuration, capable of serving as antenna elements 110 in order to maximize the frequency range over which the antenna elements 110 may emit MFRF radiation (112), e.g., throughout the HF band (3-30 MHz), L (1-2 GHz), UWB (ultra-wide band; 3.1-10.6 GHz) or W (wide band; 75-110 GHz) frequency bands. The control system 104 may control the emission of MFRF radiation 112 via the antenna elements 110, as well as the propulsion control system 108, based on commands or other user input received via wireless link (114) with a remote operator 116. The UAS 102 may operate with some degree of autonomy, e.g., according to a preprogrammed mission profile or flight plan stored to onboard memory accessible to the control system 104. The system 100 may include additional UAS 102*a-b*, wirelessly linked (114*a-b*) to the same remote operator 116 via their individual onboard control systems 104*a-b*. For example, the remote operator 116 may dispatch the swarm of UAS 102, 102*a-b* to perform one or more MFRF functions, either individually or collectively, depending on the CONOPS or according to a mission profile or flight plan.

Applicable MFRF functions may include, but are not limited to, signals intelligence (SIGINT), communications intelligence (COMINT), electronic intelligence (ELINT), electronic support measures (ESM), electronic attack (EA), communications/navigation/surveillance (CNS), data link, relative navigation/precision navigation timing (PNT), geolocation, radar imaging/mapping, ground moving target indicator (GMTI), collision avoidance, fire control, and weather spotting.

Figure 2:
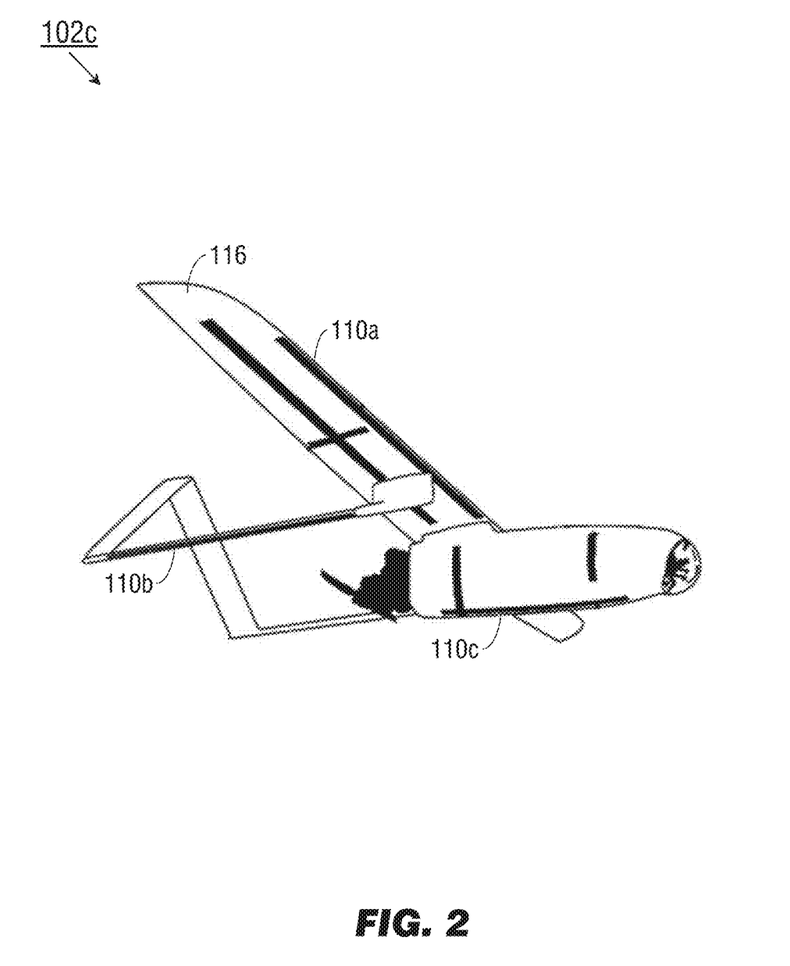
FIG. 2 illustrates the compact UAS of FIG. 1.

Referring now to FIG. 2, the UAS 102*c* may be implemented and may function similarly to the UAS 102 of FIG. 1, except that the UAS 102*c* may incorporate embedded antenna elements 110*a-c*. For example, the exterior superstructure or "skin" (116) of the UAS 102*c* may incorporate antenna elements 110*a-c* embedded into the leading edge or tips of the wings (110*a*), tail assembly (110*b*), or fuselage (110*c*) of the UAS 102*c*. The antenna elements 110*a-c* may be embedded into the superstructure 116 to achieve a particular pattern or to maximize the surface area of the superstructure 116 available for emission of MFRF radiation (112, FIG. 1).

Figure 3A:
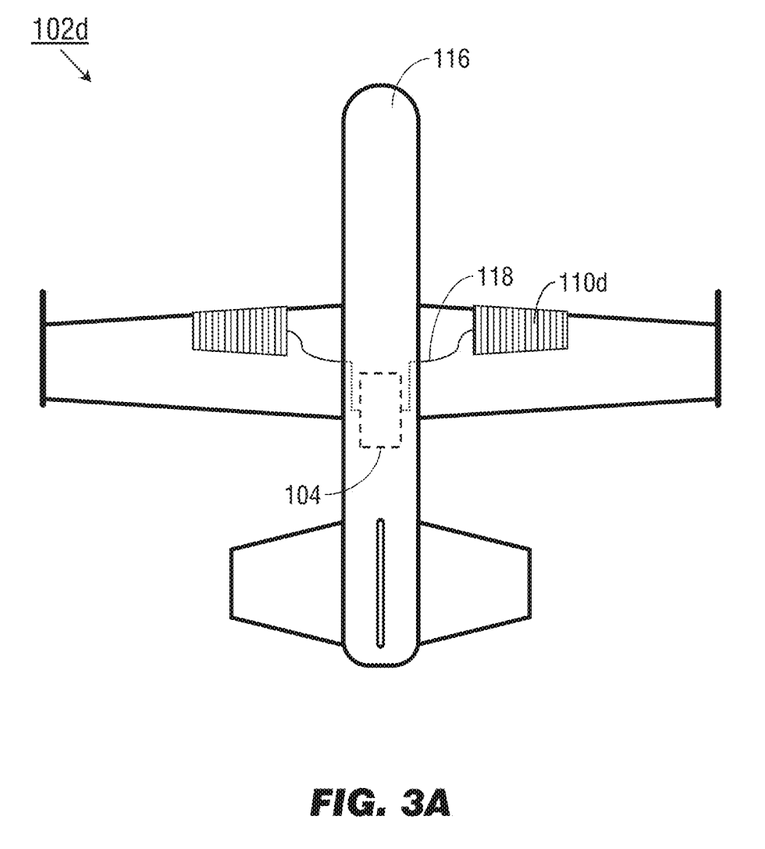
FIG. 3A illustrates the compact UAS of FIG. 1.
Figure 3B:
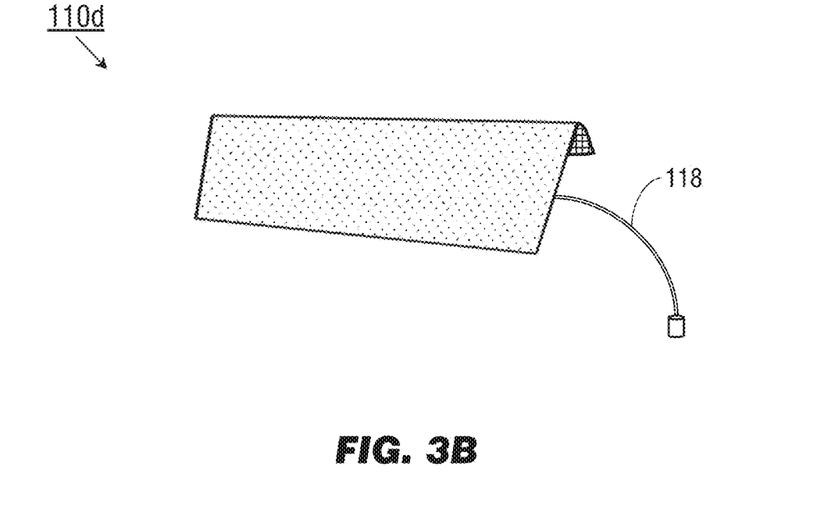
FIG. 3B illustrates a conformal antenna element of the compact UAS of FIG. 3A.

Referring now to FIGS. 3A and 3B, the UAS 102*d* may be implemented and may function similarly to the UAS 102*c* of FIG. 2, except that the UAS 102*d* may incorporate conformal antenna elements (110*d*) (e.g., appliqué) attached to the exterior superstructure 116. For example, the conformal antenna elements 110*d* may be fashioned as waveguide phased arrays, leaky-wave dielectric antennas, or other antenna elements mountable to the superstructure 116 in an unobtrusive manner and connectable (118) to the onboard control system 104. The conformal antenna elements 110*d* may be attached to the fuselage or wing surfaces of the UAS 102*d* in order to maximize available surface area or to achieve a particular pattern. The conformal antenna elements 110*d* may be fashioned by three-dimensional additive manufacture (3DAM) and may include printable "low-profile" elements or structures, e.g., microstrip antennas or arrays.

Figure 4A:
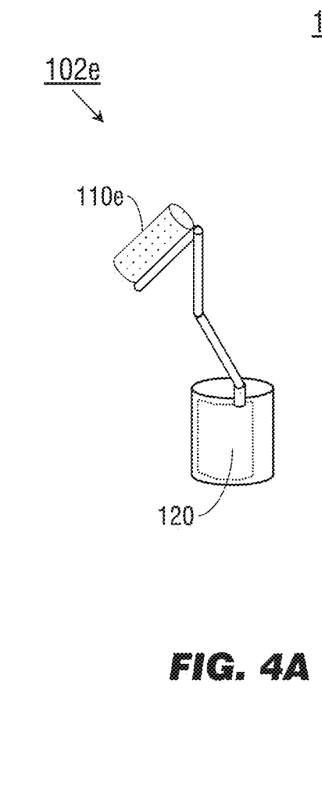
FIGS. 4A, 4B, and 4C illustrates the compact UAS of FIG. 1.
Figure 4B:
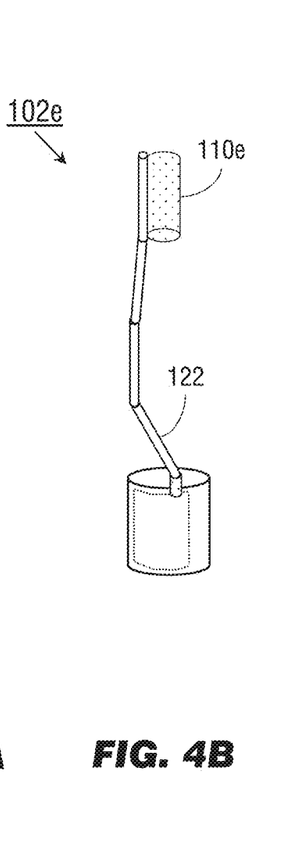
Figure 4C:
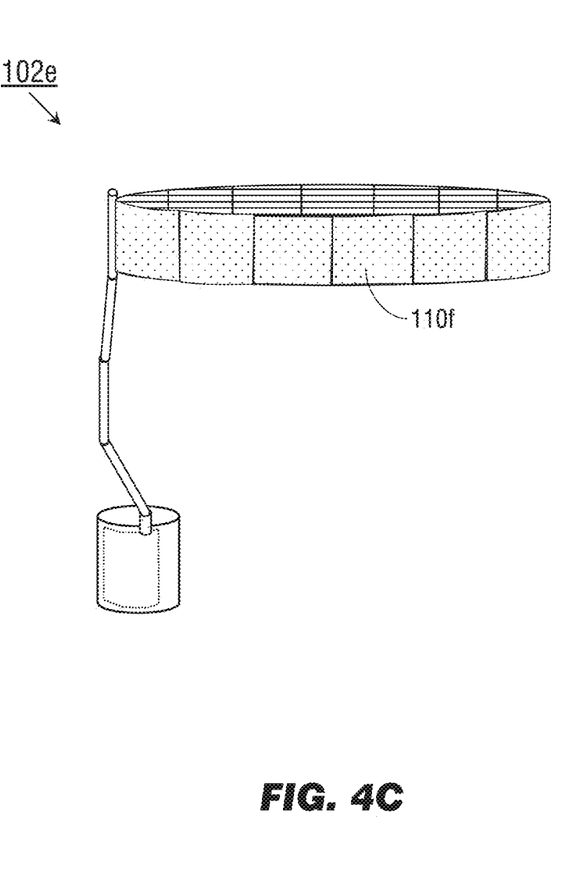

Referring now to FIGS. 4A-C, the UAS 102*e* may be implemented and may function similarly to the UAS 102*d* of FIG. 3A, except that the UAS 102*e* may incorporate mechanically deployed antenna elements 110*e*. For example, the mechanically deployed antenna elements 110*e* may be initially positioned within the UAS 102*e*, e.g., stowed by mechanical tension behind an exterior panel (120) from whence the mechanically deployed antenna elements 110*e* emerge once in flight, e.g., extending from the UAS 102*e* (via unfolding control arms (122), trailing wires, or similar appropriate deployment mechanisms) and, referring in particular to FIG. 4C, fully unfolding (110*f*) or unspooling. The precise configuration of the mechanically deployed antenna elements 110*e* may be determined by aerodynamic or atmospheric constraints (e.g., the environment in which the UAS 102*d* is operating) in addition to the size and shape of the UAS 102*d*.

Figure 5A:
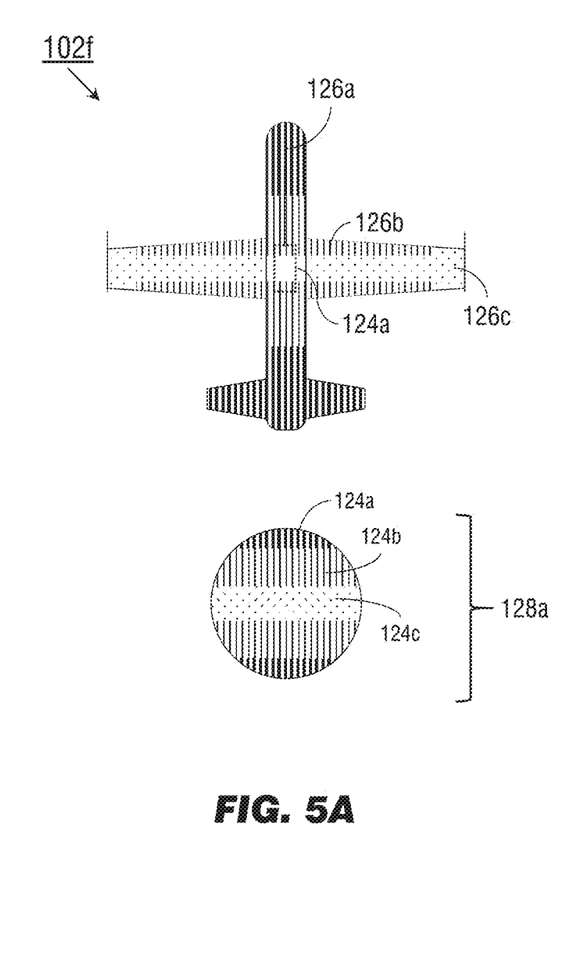
FIGS. 5A and 5B illustrate the compact UAS of FIG. 1.
Figure 5B:
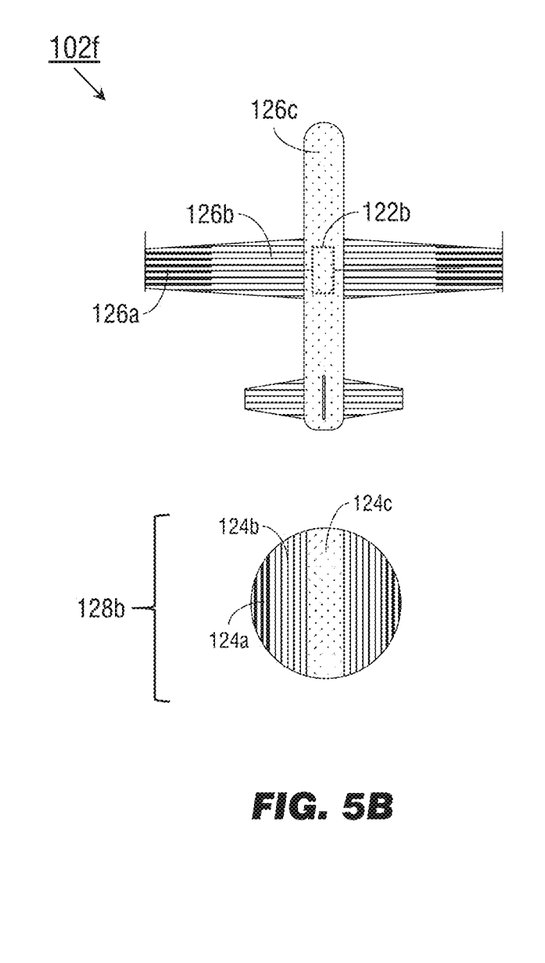

Referring now to FIGS. 5A and 5B, the UAS 102*f* may be implemented and may function similarly to the UAS 102*e* of FIGS. 4A-C, except that the UAS 102*f* may incorporate one or more characteristic mode (CM; eigenmode) transducers (124*a-b*) configured to function as electrically small antennas, judiciously exciting the natural resonances of conductive (e.g., metallic) portions of the exterior superstructure 116 to synthesize radiation, such that the UAS 102*f* may itself function as an antenna. For example, the CM transducers 124*a* and 124*b* may excite the conductive surfaces of the UAS 102*f* respectively at high, medium, and low intensity (126*a-c*) according to a desired pattern depending on the orientation (128a-b) of the CM transducers (122a-b), allowing a UAS 102f of relatively small surface area to perform MFRF functions associated with higher wavelengths and correspondingly lower frequencies.

Figure 6:
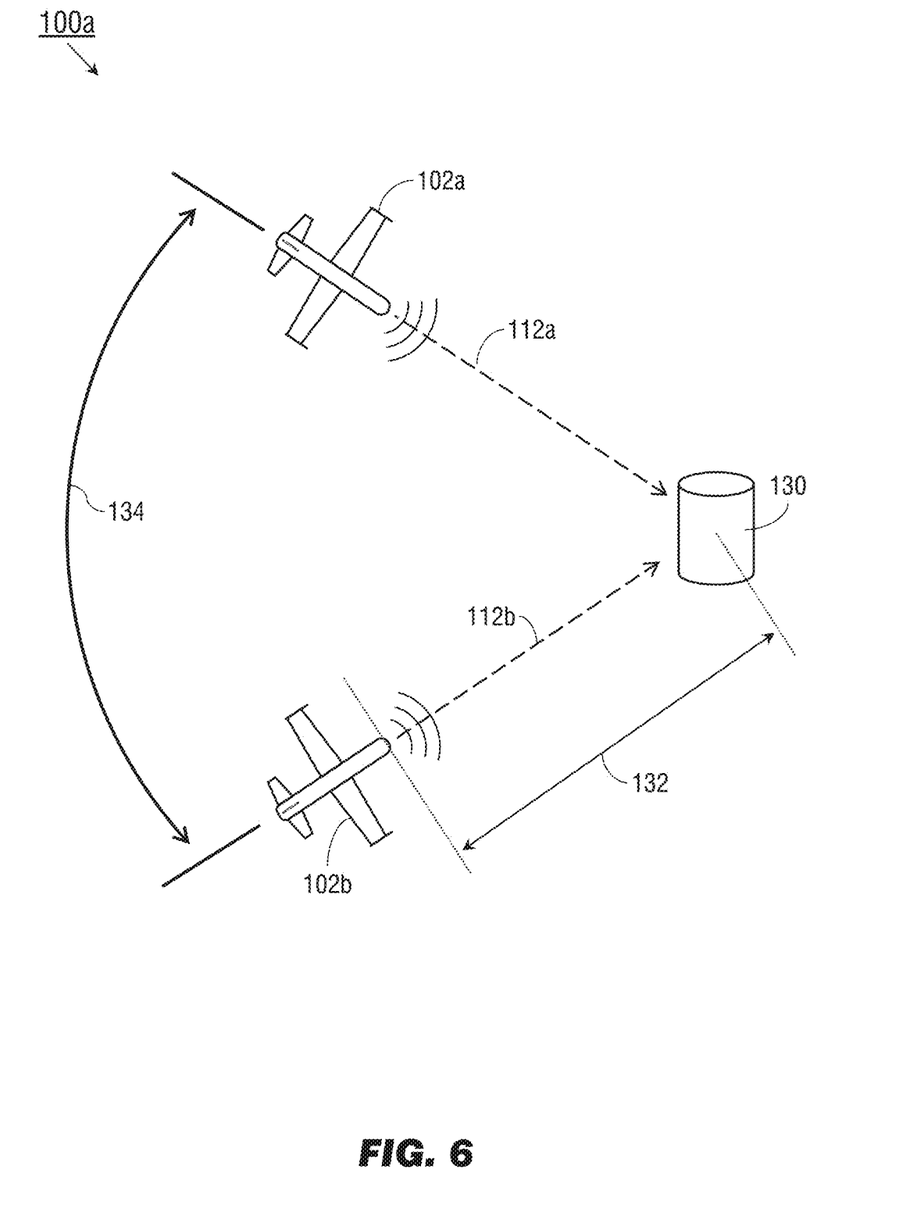
FIG. 6 illustrates operations of the MFRF system of FIG. 1.

Referring now to FIG. 6, the MFRF system 100a may be implemented and may function similarly to the MFRF system 100 of FIG. 1, except that the system 100a may deploy multiple UAS 102a-b to create synthetic apertures in support of MFRF operating modes or mission objectives. For example, conventional radar imaging via manned aircraft may require multiple terrain flyovers in order to assemble multiple time-stamped low-resolution radar images which may be assembled via post-processing to generate high-resolution images and precise differential locations of image elements. The MFRF system 100a may eliminate the need for post-processing by deploying multiple low-cost UAS 102a-b to conduct radar imaging (112a-b) of a target 130, e.g., from a predetermined radial distance 132. The resulting ad hoc synthetic aperture (134) allows for real-time MFRF functions such as, e.g., time-transfer (for relative navigation/PNT), or distributed imaging (including distributed processing of real-time image streams from UAS 102a-b). The creation of ad hoc synthetic apertures (134) may enable swarms of small or micro-size UAS 102a-b to simulate electronically scanned arrays (ESA) or digital beam formed arrays.

Figure 7:
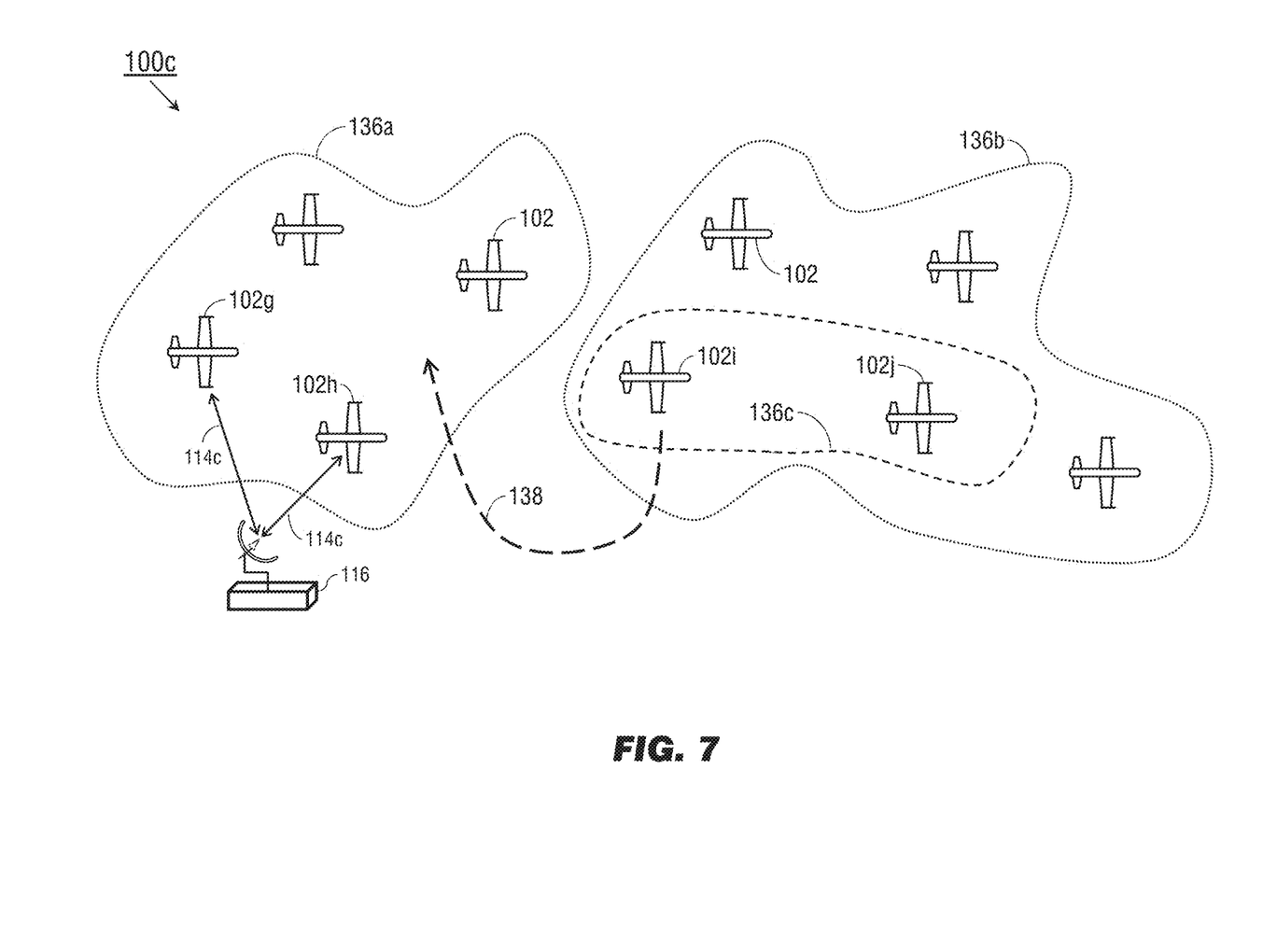
FIG. 7 illustrates operations of the MFRF system of FIG. 1.

Referring now to FIG. 7, the MFRF system 100c may be implemented and may function similarly to the MFRF system 100b of FIG. 6, except that the MFRF system 100c may deploy multiple swarms 136a-b of UAS 102 according to predetermined mission objectives. Similarly, the swarms 136a-b may themselves be sub-swarms broken off from a larger UAS swarm. A single moderate to large UAS (e.g., Predator, Global Hawk, etc.) may be capable of only a single MFRF function from a single location at any given time, may be expensive to operate, and (due to the operating cost) may not be expendable or easily replaceable. However, the swarms 136a-b may comprise groups of low-cost, custom, three-dimensional Additive Manufacture (3DAM) UAS 102 capable of coordinating their operations to achieve multiple MFRF functions according to mission objectives or flight plans. Each UAS 102 of the swarm 136a-b may not, for example, have the full complement of sensor capabilities of the MFRF system 100b; the swarm 136a may be dedicated to radar surveillance and the swarm 136b may be dedicated to SIGINT functions, for example. Some member UAS (102g-h) of the swarm 136a may rely on remote operators (116) or other ground-based relay stations to relay communications (114c) between the UAS 102g-h, rather than communicating directly. However, overlap of MFRF mode capabilities between swarms 136a-b may allow for graceful failure and dynamic reconfiguration of swarms and sub-swarms. For example, the UAS 102i-j, attached to the swarm 136b, may be implemented and may function similarly to the UAS 102, except that the UAS 102i-j may detach from the swarm 136b (based, e.g., on user input received from the remote operator (116)) and form a new subswarm 136c dedicated to MFRF functions other than those assigned to the swarms 132a-b. Similarly, the swarm 136a may be dedicated to stand-in electronic attack (EA) radar jamming (as opposed to long-distance stand-off jamming performed by a larger, more expensive, non-expendable UAS). An individual UAS 102g-h of the swarm 136a may be able to perform stand-in jamming at a lower energy level, with less path loss and separation, than a single UAS, as the individual UAS 102 may be replaced, in the event of system failure or destruction, by another UAS 102 of the swarm 136a (graceful failure). Similarly, the UAS 102i may be redeployed (138) from the swarm 136b to the swarm 136a if the stand-in EA jamming functions of the swarm 136a are of particularly high priority or the swarm 136a loses a sufficiently high number of member UAS 102.

Figure 8:
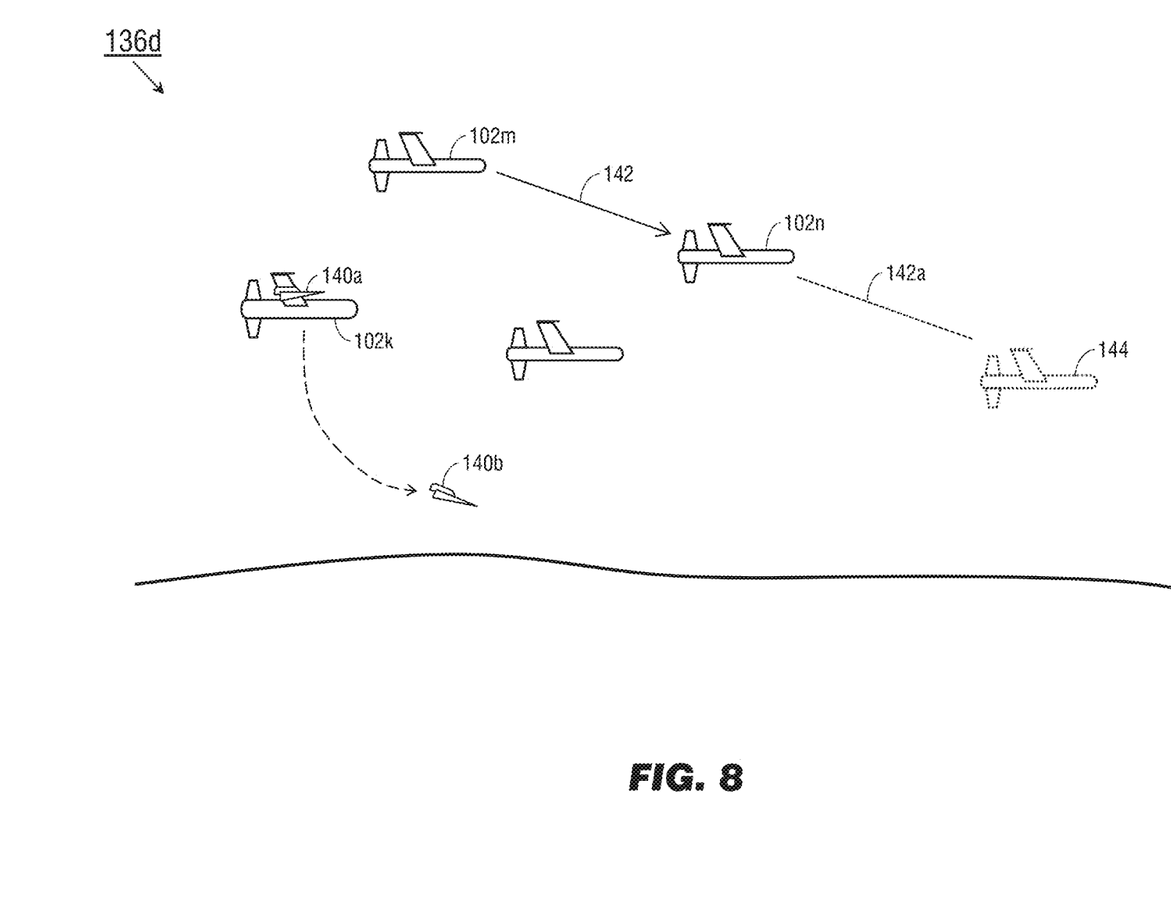
FIG. 8 illustrates operations of the dynamically reconfigurable UAS swarm of FIG. 7.

Referring now to FIG. 8, the swarm 136d may be implemented and may function similarly to the dynamically reconfigurable swarms and subswarms 136a-c of FIG. 7, except that the swarm 136d may include a "mothership" UAS 102k (e.g., a small-scale UAS) capable of launching or releasing one or more micro-scale satellite UAS (140a-b) carried by the mothership UAS 102k either internally or externally. For example, the satellite UAS 140a may be fixed to a wing or other external surface of the mothership UAS 102k for eventual launch or release, or carried within an interior compartment of the mothership UAS 102k. The satellite UAS 140a-b may be independently powered similarly to the mothership UAS 102k, e.g., via rockets, rotors, or other like power sources, and travel to an airborne destination for fulfillment of MFRF objectives in conjunction with other member UAS of the swarm 136d.

Alternatively, the satellite UAS 140b may be launched as a projectile from the mothership UAS 102k, or may glide upon release to fulfill MFRF mission objectives (e.g., ground sensing, signal relay) from a ground-based position.

The swarm 136d may also include member UAS 102m-n configured to collaborate in the fulfillment of distributed electronic countermeasures (ECM; e.g., radar spoofing, radar jamming, Digital Radio Frequency Memory (DRFM) techniques, etc.). For example, the UAS 102n may operate as a passive array by receiving a radar signal (142; e.g., a position signal) transmitted by the UAS 102m. The UAS 102n may digitally reconstruct the received signal 142, relaying or redirecting (142a) the reconstructed signal to simulate the presence of the UAS 102m at a false location (144) not physically occupied by the UAS 102m.

As will be appreciated from the above, systems and methods according to embodiments of the inventive concepts disclosed herein may facilitate cost-effective MFRF operations, particularly in hazardous or rapidly changing environments, by providing for the 3DAM fabrication of greater volumes of small or micro-sized UAS capable of coordinating operations to achieve a broader array of MFRF functions than any single UAS. Furthermore, the low cost of small/micro UAS according to the inventive concepts disclosed herein enables dynamic reconfiguration and graceful failure of UAS swarms depending on environmental conditions or changing mission priorities.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. An unmanned aircraft system (UAS), comprising:
an onboard control system wirelessly coupled to a remote operator, the onboard control system configured to adjust at least one of a position, a heading, and an orientation of the UAS based on user input received from the remote operator
at least one memory coupled to the onboard control system and configured to store one or more of a mission profile and a flight plan;
and
one or more external surfaces incorporating at least one antenna element stowed therebeneath, each antenna element coupled to the onboard control system and an onboard power source, the at least one antenna element configured for emitting at least one multifunctional radio frequency (MFRF) signal;
the onboard control system configured to execute one or more MFRF functions selected from the group including signals intelligence (SIGINT), electronic support measures (ESM), electronic attack (EA), and surveillance, by:
deploying the at least one antenna element based on the received user input from the remote operator;
and
coordinating the adjusting at least one of a position, a heading, and an orientation of the UAS and the emitting at least one MFRF signal with at least one coordinating UAS based on one or more instructions selected from the stored mission profile, the stored flight plan, and the received user input.

2. The UAS of claim 1, further comprising:
at least one characteristic mode transducer coupled to the onboard power source and configured to emit the at least one MFRF signal;
the at least one external surface including one or more conductive surfaces coupled to the at least one characteristic mode transducer and configured to radiate in response to the at least one MFRF signal.

3. The UAS of claim 1, wherein the at least one antenna element includes at least one electronically scanned array (ESA).

4. The UAS of claim 1, wherein the UAS or at least one coordinating UAS is fashioned via three-dimensional additive manufacturing (3DAM).

5. The UAS of claim 1, wherein:
the UAS is configured to collaboratively execute one or more MFRF functions with the at least one coordinating UAS by forming one or more ad hoc synthetic apertures.

6. The UAS of claim 5, wherein the one or more MFRF functions include distributed imaging of one or more targets.

7. The UAS of claim 1, wherein:
the UAS is configured to collaboratively execute one or more distributed electronic countermeasures (ECM) with the at least one coordinating UAS.

8. The UAS of claim 7, wherein:
the at least one coordinating UAS includes a decoy UAS associated with a first location; and
the UAS is configured to:
receive at least one decoy signal from the decoy UAS; and
simulate the presence of the decoy UAS at one or more decoy locations other than the first location by reconstructing the at least one received decoy signal.

* * * * *